(12) United States Patent
Gotoh et al.

(10) Patent No.: US 8,797,306 B2
(45) Date of Patent: Aug. 5, 2014

(54) DISPLAY DEVICE WITH OPTICAL SENSORS

(75) Inventors: Toshimitsu Gotoh, Osaka (JP); Atsushi Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 226 days.

(21) Appl. No.: 13/519,324

(22) PCT Filed: Oct. 20, 2010

(86) PCT No.: PCT/JP2010/068435
§ 371 (c)(1),
(2), (4) Date: Jun. 27, 2012

(87) PCT Pub. No.: WO2011/083609
PCT Pub. Date: Jul. 14, 2011

(65) Prior Publication Data
US 2012/0287093 A1 Nov. 15, 2012

(30) Foreign Application Priority Data
Jan. 8, 2010 (JP) ................................. 2010-002929

(51) Int. Cl.
*G06F 3/038* (2013.01)

(52) U.S. Cl.
USPC ........................... 345/207; 345/175; 345/204

(58) Field of Classification Search
CPC ..... G09G 3/34; G09G 3/3406; G09G 3/3648; G09G 2360/144; G09G 2360/145; G06F 3/042; G06F 3/0412; G06F 3/0421
USPC .................. 345/173–178, 204–215
See application file for complete search history.

(56) References Cited

U.S. PATENT DOCUMENTS 7,522,149 B2 *  4/2009  Nakamura et al. ............. 345/104
8,300,005 B2 * 10/2012  Tateuchi et al. ............... 345/104
(Continued)

FOREIGN PATENT DOCUMENTS

| JP | 2004-193482 A | 8/2004 |
| JP | 2004-318819 A | 11/2004 |
| JP | 2007-163891 A | 6/2007 |
| JP | 2008-262548 A | 10/2008 |

OTHER PUBLICATIONS

Official Communication issued in International Patent Application No. PCT/JP2010/068435, mailed on Feb. 1, 2011.

*Primary Examiner* — Vijay Shankar
(74) *Attorney, Agent, or Firm* — Keating & Bennett, LLP

(57) ABSTRACT

In a display device with optical sensors, a recognition processing portion (22) performs recognition processing on a scan picture generated by optical sensors (2), and calculates a position. A mode control portion (24) determines whether or not the mode is standby so that the recognition processing portion (22) is stopped from operating. At the time of transition to the standby mode, decimated image memory (25) stores a decimated image with a decreased number of pixels. The mode control portion (24) performs pixel-by-pixel comparison between the stored decimated image and a decimated image supplied anew, and exits the standby mode when the number of pixels whose difference in pixel values is greater than or equal to a first threshold is greater than or equal to a second threshold. Here, the first and second thresholds are appropriately set in accordance with an ambient luminance L from a luminance sensor (20), and therefore, any change in the image can be accurately distinguished from noise, thereby preventing the standby mode from being or not being cancelled by mistake.

9 Claims, 9 Drawing Sheets

(56) References Cited

U.S. PATENT DOCUMENTS

| | | | |
|---|---|---|---|
| 8,390,578 B2 * | 3/2013 | Chino | 345/173 |
| 8,638,317 B2 * | 1/2014 | Harada et al. | 345/175 |
| 2006/0192766 A1 | 8/2006 | Nakamura et al. | |
| 2007/0132710 A1 | 6/2007 | Tateuchi et al. | |
| 2008/0231564 A1 | 9/2008 | Harada et al. | |
| 2009/0207154 A1 | 8/2009 | Chino | |

* cited by examiner

DISPLAY DEVICE WITH OPTICAL SENSORS

TECHNICAL FIELD

The present invention relates to display devices, particularly to a display device having a plurality of optical sensors provided on a display panel.

BACKGROUND ART

Recent years have seen widespread use of electronic equipment which can be operable by touching its screen with a finger, a pen, or the like. In a known method for detecting a touch position in a display screen, a plurality of optical sensors are provided on a display panel and used to sense a projected or reflected image formed by a finger or suchlike approaching the screen. In another known method, to detect a touch position with high accuracy for any display data, a display device is provided with an infrared backlight for emitting infrared light, and a reflected image formed by infrared light is sensed using optical sensors.

In addition to the infrared backlight, such a display device with optical sensors is provided with, for example, an A/D converter for converting signals being read from the optical sensors into digital signals and a recognition processing portion for obtaining touch positions on the basis of the resultant digital signals. Consequently, the display device with optical sensors has a problem of its power consumption being higher than display devices without optical sensors.

Therefore, in one conceivable method for reducing power consumption, the display device with optical sensors has a normal mode and a standby mode set therefor, and in the standby mode, circuits can be stopped from operating or their operation can be slowed. In relation to this, Japanese Laid-Open Patent Publication No. 2009-193482 discloses a configuration in which, when the operation mode is normal, a received optical signal for one screen is read at intervals of 60 Hz, and in a low-consumption mode (standby mode), a received optical signal for one screen is read at intervals of 10 Hz.

CITATION LIST

Patent Document

Patent Document 1: Japanese Laid-Open Patent Publication No. 2009-193482

SUMMARY OF THE INVENTION

Problems to be Solved by the Invention

However, in the display device described in Japanese Laid-Open Patent Publication No. 2009-193482, a recognition processing portion for detecting coordinates is in operation even in the standby mode (low-consumption mode). Accordingly, although the frequency at which to read images is reduced, basic operations are not different from those in the normal mode. Therefore, power consumption is not significantly reduced. In particular, the backlight provided in this conventional display device consumes a relatively large amount of power, and therefore, so long as the backlight is lit up in the standby mode as in the normal mode, power consumption cannot be significantly reduced.

In this regard, to reduce power consumption, a conceivable configuration keeps the backlight unlit in the standby mode. However, in the configuration which simply keeps the backlight unlit in the standby mode, light detection cannot be performed in the same manner as in the normal mode, and therefore, coordinate detection is not possible in the standby mode. As a result, a quick exit from the standby mode is not possible.

Furthermore, in a conceivable configuration, optical detection can be performed using outside light at least in the standby mode, but when outside light is weak (ambient luminance is low), it is difficult to detect a touch position, and erroneous detection occurs more often. As a result, it is difficult to correctly exit the standby mode.

Therefore, an objective of the present invention is to provide a display device with optical sensors which is capable of significantly reducing power consumption in the standby mode and promptly detecting a touch position by correctly and quickly exiting the standby mode.

Solution to the Problems

A first aspect of the present invention is directed to a display device provided with a plurality of optical sensors, comprising:
a display panel including two-dimensionally arranged pixel circuits and optical sensors;
a driver circuit for performing operations of writing signals to the pixel circuits in accordance with display data and reading signals from the optical sensors in accordance with amounts of received light;
a recognition processing portion for performing recognition processing on a recognition target image based on signals being read from the optical sensors in a normal mode, and outputting coordinate data indicating a position of a sensing target;
a mode control portion for determining whether a mode is normal or standby and causing the recognition processing portion to operate in the normal mode or stop operating in the standby mode;
an image storage portion for storing a comparison image based on signals being read from the optical sensors in transition from the normal mode to the standby mode; and
a luminance detection portion for detecting an ambient luminance, wherein,
the mode control portion causes transition from the standby mode to the normal mode when a new comparison image based on signals being read from the optical sensors is determined to have changed to a predetermined degree or more from the comparison image stored in the image storage portion, the predetermined degree corresponding to the ambient luminance detected by the luminance detection portion.

In a second aspect of the present invention, based on the first aspect of the invention, the mode control portion performs pixel-by-pixel comparison between the comparison image stored in the image storage portion and the new comparison image, and causes transition from the standby mode to the normal mode when the number of pixels whose difference in pixel values is greater than or equal to a first threshold is greater than or equal to a second threshold.

In a third aspect of the present invention, based on the second aspect of the invention, at least one of the first and second thresholds is determined in accordance with the ambient luminance detected by the luminance detection portion.

In a fourth aspect of the present invention, based on the third aspect of the invention, the at least one of the first and second thresholds is determined so as to monotonically increase relative to the ambient luminance detected by the luminance detection portion.

In a fifth aspect of the present invention, based on the first aspect of the invention, further comprised is an infrared backlight for emitting infrared light, and the mode control portion turns off or dims the infrared backlight in the standby mode in accordance with the ambient luminance detected by the luminance detection portion.

In a sixth aspect of the present invention, based on the first aspect of the invention, the comparison image has a smaller number of pixels than the recognition target image.

In a seventh aspect of the present invention, based on the sixth aspect of the invention, the comparison image is an image obtained by decimating the pixels from the recognition target image.

In an eighth aspect of the present invention, based on the seventh aspect of the invention, the driver circuit reads a lesser quantity of signals from the optical sensors in the standby mode than in the normal mode in accordance with a result of determination by the mode control portion.

A ninth aspect of the present invention is directed to a method for controlling a display device provided with a display panel including two-dimensionally arranged pixel circuits and optical sensors, and a recognition processing portion for performing recognition processing on a recognition target image based on signals being read from the optical sensors and outputting coordinate data indicating a position of a sensing target, the method comprising:

a step of writing signals to the pixel circuits in accordance with display data;

a step of reading signals from the optical sensors in accordance with amounts of received light;

a step of determining whether a mode is normal or standby;

a step of activating the recognition processing portion in the normal mode;

a step of stopping the recognition processing portion from operating in the standby mode;

a step of storing a comparison image based on signals being read from the optical sensors in transition from the normal mode to the standby mode; and a luminance detection step of detecting an ambient luminance, wherein, in the step of determining the mode, transition from the standby mode to the normal mode takes place when a new comparison image based on signals being read from the optical sensors is determined to have changed to a predetermined degree or more from the comparison image stored in the image storage step, the predetermined degree corresponding to the ambient luminance detected in the luminance detection step.

Effect of the Invention

According to the first or ninth aspect of the present invention, it is determined whether the mode is normal or standby, and the recognition processing portion is stopped from operating in the standby mode, thereby reducing power consumption of the display device. Moreover, when the comparison image based on signals being read from the optical sensors changes to a predetermined degree corresponding to the ambient luminance, or more than the predetermined degree, after transition to the standby mode, the mode transitions to normal. As a result, the transition to the normal mode can take place before a sensing target touches the screen. Accordingly, a touch position can be promptly detected after a quick exit from the standby mode, and an accurate distinction from noise can be made by a determination according to the ambient luminance, so that the standby mode can be prevented from being or not being cancelled by mistake. Thus, the standby mode can be correctly exited.

According to the second aspect of the present invention, the stored comparison image and the new comparison image are compared pixel by pixel, and transition to the normal mode takes place when the number of pixels whose difference in pixel values is greater than or equal to the first threshold is greater than or equal to the second threshold, so that the transition to the normal mode can take place before a sensing target touches the screen. Thus, a touch position can be promptly detected after a quick exit from the standby mode.

According to the third aspect of the present invention, at least one of the first and second thresholds is determined in accordance with the ambient luminance, and therefore, by determining at least one of the first and second thresholds so as to avoid or reduce the influence of a change in the ambient luminance, it is rendered possible to accurately determine whether or not to cancel the standby mode.

According to the fourth aspect of the present invention, at least one of the first and second thresholds is determined so as to monotonically increase relative to the ambient luminance, and therefore, for example, when the ambient luminance is low, the first threshold is set low, so that a change in a new comparison image can be distinguished from noise and even a slight change can be accurately detected, thereby preventing the standby mode from not being cancelled by the erroneous determination that there is no change. Moreover, when the ambient luminance is high, the first threshold is set high, thereby avoiding erroneous determination due to a slight change in pixel values caused by noise or suchlike, so that a change in the new comparison image can be accurately detected. Furthermore, when the ambient luminance is low, the second threshold is set low, so that a change in the new comparison image can be accurately detected on the basis of a small number of pixels whose pixel values have changed. Further still, when the ambient luminance is high, the second threshold is set high, thereby preventing the standby mode from being erroneously cancelled by mistaking a change in the new comparison image due to increased noise for a change in an image of the sensing target. Thus, a touch position can be promptly detected after a correct exit from the standby mode.

According to the fifth aspect of the present invention, the infrared backlight is turned off or dimmed in the standby mode, so that power consumption of the display device can be reduced.

According to the sixth aspect of the present invention, the mode determination process is performed using the comparison image having a smaller number of pixels than the recognition target image, so that the size of memory and the amount of computation required for the mode determination process can be reduced.

According to the seventh aspect of the present invention, the comparison image is an image obtained by decimating the pixels from the recognition target image, so that the comparison image can be readily generated without performing processing for calculating an average value and other processing.

According to the eighth aspect of the present invention, the driver circuit is slowed in operation in the standby mode, making it possible to reduce power consumption of the display device while generating the comparison image required for the mode determination process.

MODE FOR CARRYING OUT THE INVENTION

Figure 1:
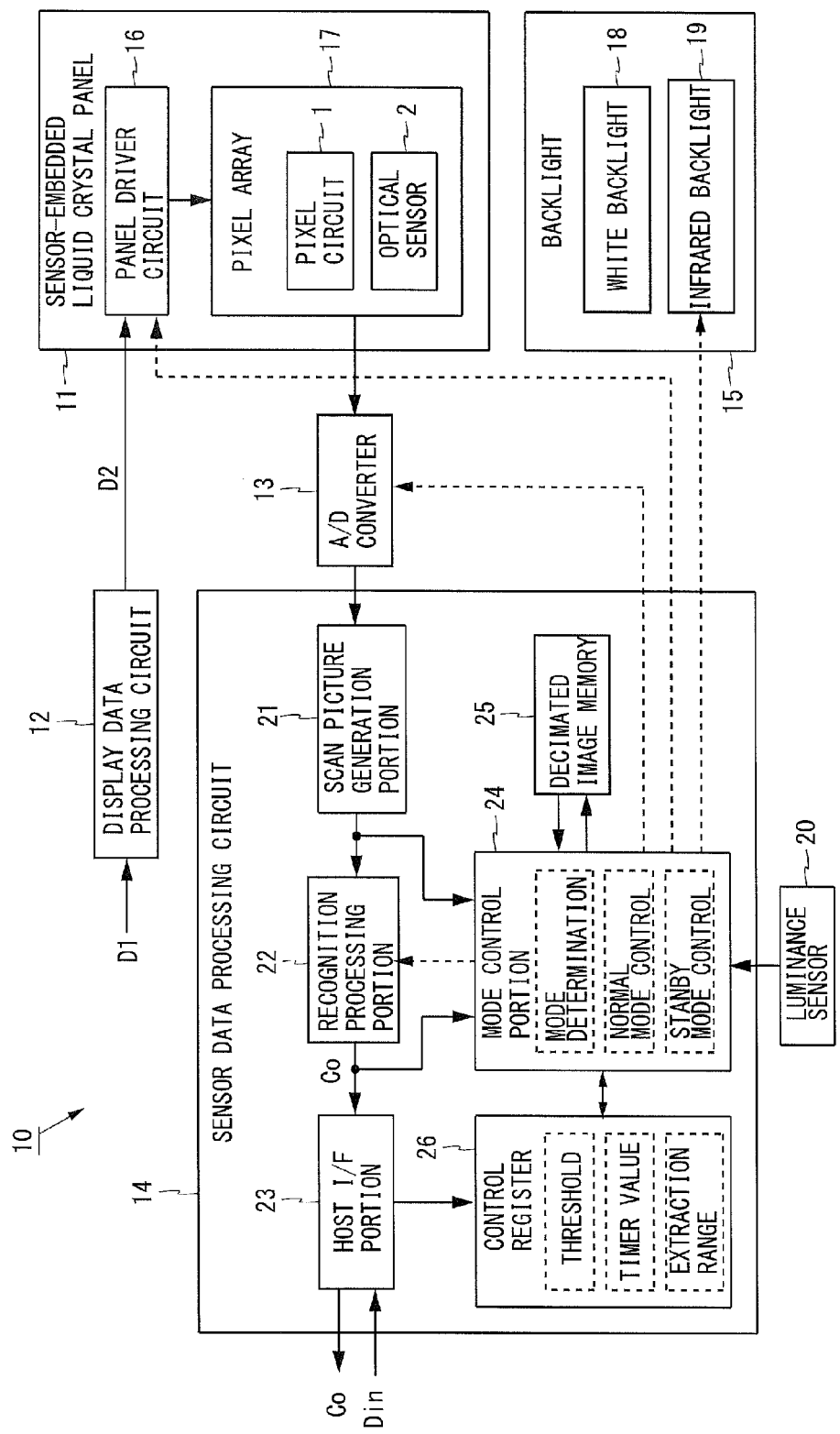
FIG. 1 is a block diagram illustrating the configuration of a liquid crystal display device according to an embodiment of the present invention.

FIG. 1 is a block diagram illustrating the configuration of a liquid crystal display device according to an embodiment of the present invention. The liquid crystal display device 10 shown in FIG. 1 is provided with a sensor-embedded liquid crystal panel 11 (hereinafter, simply referred to as a liquid crystal panel), a display data processing circuit 12, an A/D converter 13, a sensor data processing circuit 14, a backlight 15, and a luminance sensor 20. The liquid crystal panel 11 includes a panel driver circuit 16 and a pixel array 17. The pixel array 17 has a plurality of pixel circuits 1 and a plurality of optical sensors 2 arranged two-dimensionally.

The liquid crystal display device 10 externally receives display data $D_1$. The display data processing circuit 12 performs as necessary color correction processing, frame-rate conversion processing, or the like, on the display data $D_1$, and outputs display data $D_2$. The panel driver circuit 16 writes voltages, which correspond to the display data $D_2$, to the pixel circuits 1. As a result, the liquid crystal panel 11 displays an image based on the display data $D_2$.

The backlight 15 illuminates the back of the liquid crystal panel 11 with light (backlight) on the basis of a source voltage supplied by a backlight power source circuit (not shown). The backlight 15 includes a white backlight 18 for emitting white light and an infrared backlight 19 for emitting infrared light. The white backlight 18 is provided for image display, and the infrared backlight 19 is provided for touch position detection.

In addition to the operation of writing voltages to the pixel circuits 1, the panel driver circuit 16 performs an operation of reading voltages from the optical sensors 2 in accordance with amounts of received light. Output signals of the optical sensors 2 (hereinafter, referred to as sensor output signals) are provided to the outside of the liquid crystal panel 11. The A/D converter 13 converts the sensor output signals, which are analog, to digital signals. The luminance sensor 20 is a sensor attached to the liquid crystal display device 10 in the vicinity of its display portion to output a voltage corresponding to an ambient luminance L at which the display portion is illuminated. Note that so long as the ambient luminance L can be detected, the luminance sensor 20 may be omitted so that the ambient luminance L is acquired, for example, from outside the display device, or the ambient luminance L is acquired on the basis of sensor data generated by a scan picture generation portion 21. This acquisition portion functions as a luminance detection portion.

The sensor data processing circuit 14 includes a scan picture generation portion 21, a recognition processing portion 22, a host interface portion 23 (hereinafter, referred to as a host I/F portion), a mode control portion 24, decimated image memory 25, and a control register 26. The scan picture generation portion 21 generates a digital image (hereinafter, referred to as a scan picture) on the basis of digital signals outputted by the A/D converter 13. The scan picture might include an image of an object to be sensed in the vicinity of the surface of the liquid crystal panel 11 (e.g., a finger, a pen, or the like; hereinafter, referred to as a target). The recognition processing portion 22 performs recognition processing on the scan picture to sense the target, thereby obtains the position of the target within the scan picture, and then outputs coordinate data Co indicating a touch position. The coordinate data Co outputted by the recognition processing portion 22 is provided to a host (not shown) via the host I/F portion 23.

Figure 2:
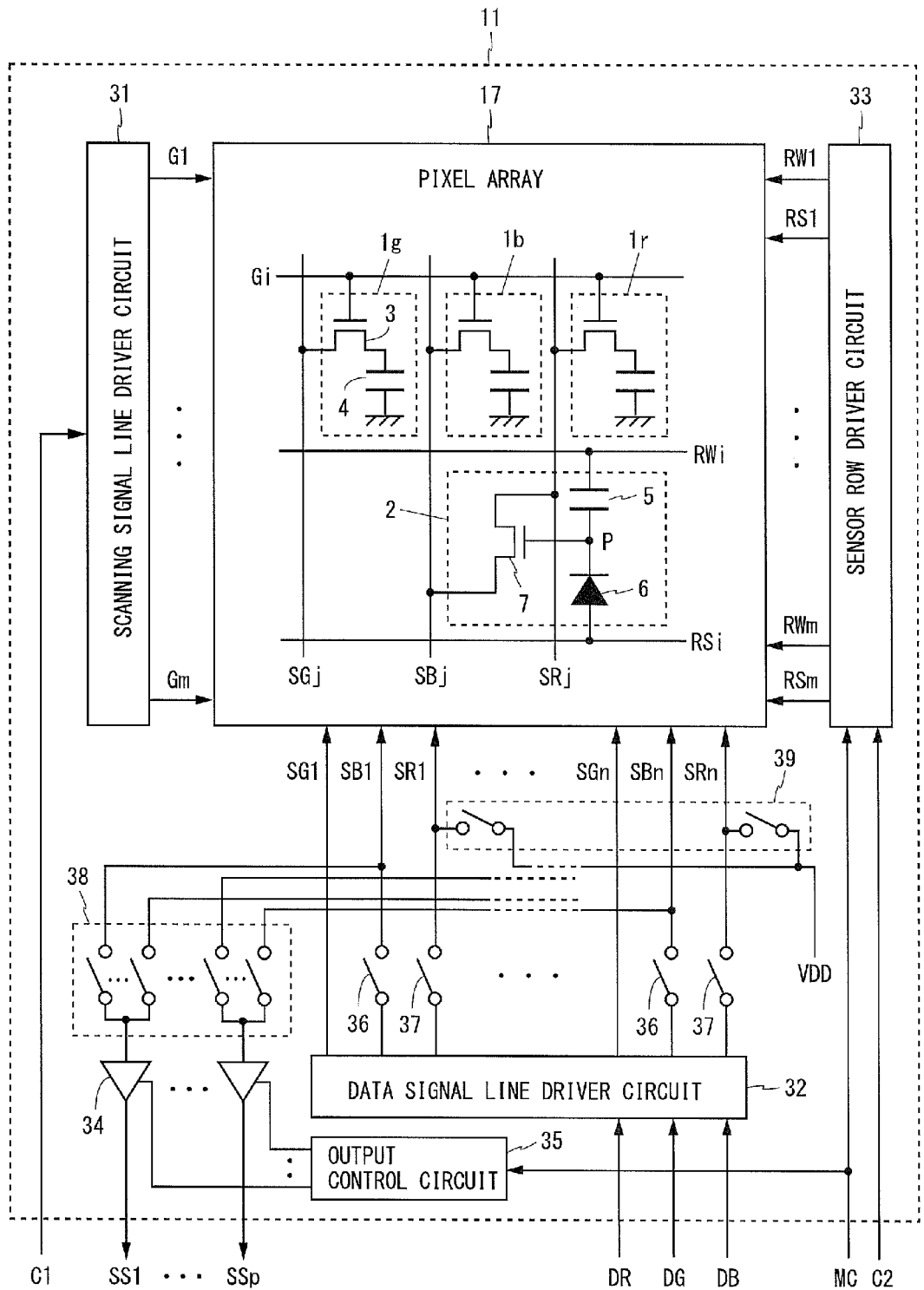
FIG. 2 is a block diagram illustrating a detailed configuration of a liquid crystal panel of the liquid crystal display device in the embodiment.

FIG. 2 is a block diagram illustrating a detailed configuration of the liquid crystal panel 11. The pixel array 17 includes m scanning signal lines $G_1$ to $G_m$, 3n data signal lines $S_{R1}$ to $S_{Rn}$, $S_{G1}$ to $S_{Gn}$, and $S_{B1}$ to $S_{Bn}$, and (m×3n) pixel circuits 1, as shown in FIG. 2. In addition, the pixel array 17 includes (m×n) optical sensors 2, m sensor readout lines $RW_1$ to $RW_m$, and m sensor reset lines $RS_1$ to $RS_m$. The liquid crystal panel 11 is formed by a well-known process using polycrystalline silicon, for example.

The scanning signal lines $G_1$ to $G_m$ are arranged in parallel with one another. The data signal lines $S_{R1}$ to $S_{Rn}$, $S_{G1}$ to $S_{Gn}$, and $S_{B1}$ to $S_{Bn}$ are arranged in parallel with one another and perpendicularly to the scanning signal lines $G_1$ to $G_m$. The sensor readout lines $RW_1$ to $RW_m$ and the sensor reset lines $RS_1$ to $RS_m$ are arranged in parallel with the scanning signal lines $G_1$ to $G_m$.

The pixel circuits 1 are provided one by one near the intersections of the scanning signal lines $G_1$ to $G_m$ and the data signal lines $S_{R1}$ to $S_{Rn}$, $S_{G1}$ to $S_{Gn}$, and $S_{B1}$ to $S_{Bn}$. The pixel circuits 1 are arranged two-dimensionally as a whole, with m of them in the direction of each column (in FIG. 2, vertically) and 3n of them in the direction of each row (in FIG. 2, horizontally). The pixel circuits 1 are classified into R pixel circuits $1_r$, G pixel circuits $1_g$, and B pixel circuits $1_b$ in accordance with the colors of color filters provided thereon. These three types of pixel circuits are arranged rowwise in the sequence of G, B, R, and each set of three forms a single pixel.

Each of the pixel circuits 1 includes a TFT (thin-film transistor) 3 and a liquid crystal capacitance 4. The TFT 3 has a gate terminal connected to a scanning signal line $G_i$ (where i is an integer between 1 and m) a source terminal connected to a data signal line $S_{Rj}$, $S_{Gj}$, or $S_{Bj}$ (where j is an integer between 1 and n), and a drain terminal connected to one electrode of the liquid crystal capacitance 4. The liquid crystal capacitance 4 has a common electrode voltage applied to the other electrode. Hereinafter, the data signal lines $S_{R1}$ to $S_{Rn}$ connected to R pixel circuits $1_r$ will be referred to as R data signal lines, and the data signal lines $S_{B1}$ to $S_{Bn}$ connected to B pixel circuits $1_b$ will be referred to as B data signal lines. Note that the pixel circuits 1 may include auxiliary capacitances.

Each of the pixel circuits 1 has its light transmittance (subpixel brightness) determined by a voltage written thereto. To write a voltage to the pixel circuit 1 connected to the scanning signal line $G_i$ and the data signal line $S_{Xj}$ (where X is R, G, or B), a high-level voltage (a voltage to turn on the TFT 3) is applied to the scanning signal line $G_i$, and a voltage to be written is applied to the data signal line $S_{Xj}$. By writing a voltage to the pixel circuit 1 in accordance with display data $D_2$ the subpixel brightness can be set to a desired level.

The optical sensors 2, each including a capacitor 5, a photodiode 6, and a sensor preamplifier 7, are provided on a pixel-by-pixel basis. The capacitor 5 has one electrode connected to a cathode terminal of the photodiode 6 (hereinafter, this connecting point will be referred to as a node P). The capacitor 5 has the other electrode connected to the sensor readout line $RW_i$, and the photodiode 6 has an anode terminal connected to the sensor reset line $RS_i$. The sensor preamplifier 7 is a TFT having a gate terminal connected to the node P, a drain terminal connected to the R data signal line $S_{Rj}$, and a source terminal connected to the B data signal line $S_{Bj}$.

To sense the amount of light with the optical sensor 2 connected to the sensor readout line $RW_i$, the B data signal line $S_{Bj}$, etc., a predetermined voltage is applied to the sensor readout line $RW_i$ and the sensor reset line $RS_i$, and a source voltage VDD is applied to the R data signal line $S_{Rj}$. When light is incident on the photodiode 6 after the predetermined voltage is applied to the sensor readout line $RW_i$ and the sensor reset line $RS_i$, current flows through the photodiode 6 in accordance with the amount of incident light, so that the voltage at the node P falls in an amount corresponding to the flowing current. At this time, by applying the source voltage VDD to the R data signal line $S_{Rj}$ after the sensor preamplifier 7 has its gate voltage raised to a threshold or higher by increasing the voltage at the node P through application of a high voltage to the sensor readout line $RW_i$, the voltage at the node P is amplified by the sensor preamplifier 7, and then outputted to the B data signal line $S_{Bj}$. Thus, the amount of light sensed by the optical sensor 2 can be obtained on the basis of the voltage on the B data signal line $S_{Bj}$.

Provided around the pixel array 17 are a scanning signal line driver circuit 31, a data signal line driver circuit 32, a sensor row driver circuit 33, p (where p is an integer between 1 and n) sensor output amplifiers 34, an output control circuit 35, and a plurality of switches 36 to 39. These circuits constitute the panel driver circuit 16 in FIG. 1.

The data signal line driver circuit 32 has $3n$ output terminals corresponding to the $3n$ data signal lines. The switches 36 are provided between the B data signal lines $S_{B1}$ to $S_{Bn}$ and n output terminals corresponding thereto, and the switches 37 are provided one by one between the R data signal lines $S_{R1}$ to $S_{Rn}$ and n output terminals corresponding thereto. The B data signal lines $S_{B1}$ to $S_{Bn}$ are divided into groups of p lines, and each group has one switch 38 provided between the k'th (where k is an integer between 1 and p) B data signal line and an input terminal of the k'th sensor output amplifier 34. The switches 39 are provided one by one between the R data signal lines $S_{R1}$ to $S_{Rn}$ and the source voltage VDD. For the switches 36 to 39 included in FIG. 2, the number is n each.

For the liquid crystal display device 10, one frame period is divided into a display period in which signals (voltage signals corresponding to display data) are written to the pixel circuits and a sensing period in which signals (voltage signals corresponding to amounts of received light) are read from the optical sensors, and the circuits shown in FIG. 2 operate differently in the display period and the sensing period. In the display period, the switches 36 and 37 are on, whereas the switches 38 and 39 are off. On the other hand, in the sensing period, the switches 36 and 37 are off, whereas the switches 39 are on, with the switches 38 being turned on in a time-division manner such that the B data signal lines $S_{B1}$ to $S_{Bn}$ are sequentially connected to input terminals of the sensor output amplifiers 34 group by group.

In the display period, the scanning signal line driver circuit 31 and the data signal line driver circuit 32 are in operation. The scanning signal line driver circuit 31 selects one of the scanning signal lines $G_1$ to $G_m$ every line period in accordance with a timing control signal $C_1$, and applies a high-level voltage to the selected scanning signal line and a low-level voltage to the remaining scanning signal lines. The data signal line driver circuit 32 drives the data signal lines $S_{R1}$ to $S_{Rn}$, $S_{G1}$ to $S_{Gn}$, and $S_{B1}$ to $S_{Bn}$ in a line-sequential system on the basis of display data $D_R$, $D_G$, and $D_B$ outputted by the display data processing circuit 12. More specifically, the data signal line driver circuit 32 stores the display data $D_R$, $D_G$, and $D_B$ for at least one row, and applies a voltage corresponding to the display data for one row to the data signal lines $S_{R1}$ to $S_{Rn}$, $S_{G1}$ to $S_{Gn}$, and $S_{B1}$ to $S_{Bn}$ every line period. Note that the data signal line driver circuit 32 may drive the data signal lines $S_{R1}$ to $S_{Rn}$, $S_{G1}$ to $S_{Gn}$, and $S_{B1}$ to $S_{Bn}$ in a dot-sequential system.

In the sensing period, the sensor row driver circuit 33, the sensor output amplifiers 34, and the output control circuit 35 are in operation. The sensor row driver circuit 33 selects one of the sensor readout lines $RW_1$ to $RW_m$ and one of the sensor reset lines $RS_1$ to $RS_m$ every line period in accordance with a timing control signal $C_2$, and applies a predetermined readout voltage and a predetermined reset voltage to the selected sensor readout and the selected reset line, respectively, and a voltage different from those for the selected lines to the remaining other signal lines. Note that, typically, the duration of one line period varies between the display period and the sensing period. The sensor output amplifiers 34 amplify voltages selected by the switches 38, and output them as sensor output signals $SS_1$ to $SS_p$. The operation of the output control circuit 35 will be described later.

Figure 3:
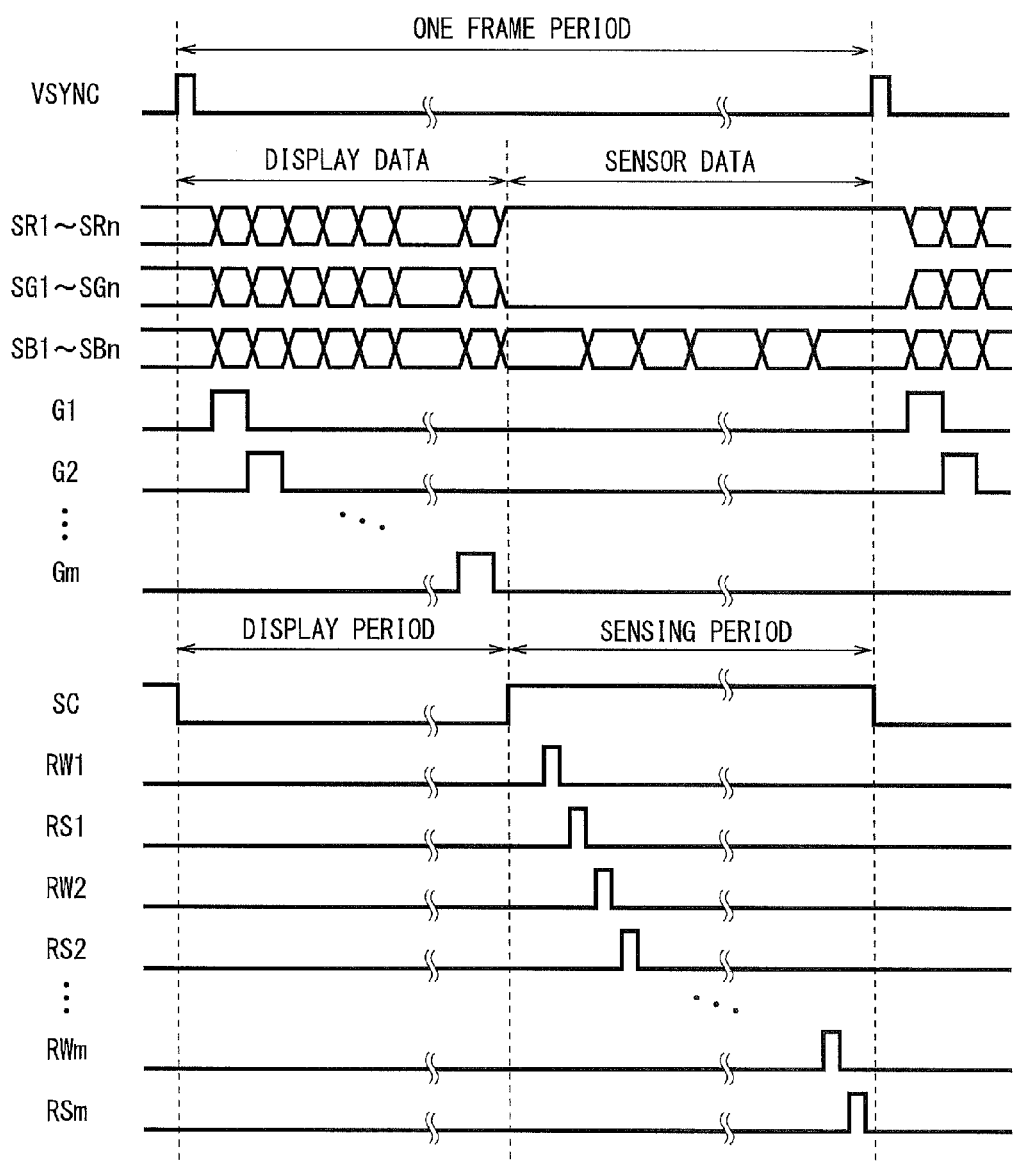
FIG. 3 is a timing chart for the liquid crystal display device in the embodiment.

FIG. 3 is a timing chart for the liquid crystal display device 10. As shown in FIG. 3, a vertical synchronization signal VSYNC turns to high level every frame period, which is divided into the display period and the sensing period. A sense signal SC is a signal indicating the display period or the sensing period, and turns to low level in the display period and high level in the sensing period.

In the display period, the switches 36 and 37 are turned on, so that the data signal lines $S_{R1}$ to $S_{Rn}$, $S_{G1}$ to $S_{Gn}$, and $S_{B1}$ to $S_{Bn}$ are all connected to the data signal line driver circuit 32. In the display period, initially, the voltage on the scanning signal line $G_1$ turns to high level, then the voltage on the scanning signal line $G_2$ turns to high level, and thereafter, the voltages on the scanning signal lines $G_3$ to $G_m$ sequentially turn to high level. While the voltage on the scanning signal line $G_i$ is maintained at high level, a voltage that is to be written to the $3n$ pixel circuits 1 connected to the scanning signal line $G_i$ is applied to each of the data signal lines $S_{R1}$ to $S_{Rn}$, $S_{G1}$ to $S_{Gn}$, and $S_{B1}$ to $S_{Bn}$.

In the sensing period, the switches 39 are turned on, and the switches 38 are turned on in a time-division manner. As a result, the source voltage VDD is invariably applied to the R data signal lines $S_{R1}$ to $S_{Rn}$, and the B data signal lines $S_{B1}$ to $S_{Bn}$ are connected to the input terminals of the sensor output amplifiers 34 in a time-division manner. In the sensing period, initially, the sensor readout line $RW_1$ and the sensor reset line $RS_1$ are selected, then, the sensor readout line $RW_2$ and the sensor reset line $RS_2$ are selected, and thereafter, the sensor readout lines $RW_3$ to $RW_m$ and the sensor reset lines $RS_3$ to $RS_m$ are sequentially selected pair by pair. A readout voltage and a reset voltage are applied to the selected sensor readout line and the selected sensor reset line, respectively. While the sensor readout line $RW_i$ and the sensor reset line $RS_i$ are being selected, voltages corresponding to the amounts of light sensed by the n optical sensors 2 connected to the sensor readout line $RW_i$ are outputted to the B data signal lines $S_{B1}$ to $S_{Bn}$. Note that in a standby mode to be described later, only some of the sensor readout lines $RW_1$ to $RW_m$ and the sensor reset lines $RS_1$ to $RS_m$ are sequentially selected pair by pair.

Figure 4:
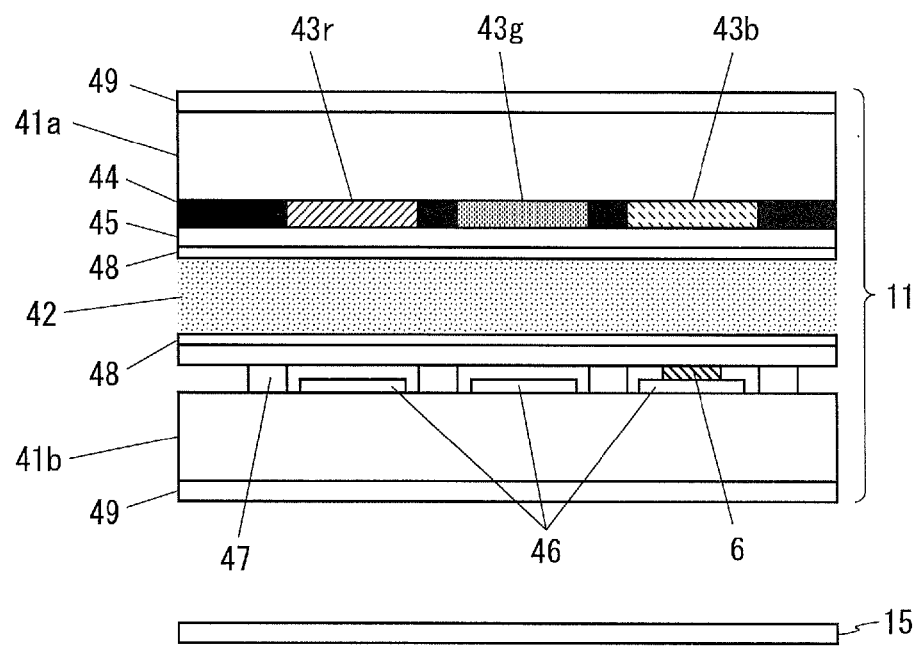
FIG. 4 is a diagram illustrating a cross section of the liquid crystal panel of the liquid crystal display device in the embodiment and the position of a backlight.

FIG. 4 is a diagram illustrating a cross section of the liquid crystal panel 11 and the position of the backlight 15. The liquid crystal panel 11 has a structure in which a liquid crystal layer 42 is sandwiched between two glass substrates 41a and 41b. One glass substrate 41a has provided thereon three color filters $43_r$, $43_g$, and $43_b$, a light-shielding film 44, an opposing electrode 45, etc., and the other glass substrate 41b has provided thereon pixel electrodes 46, data signal lines 47, the optical sensors 2, etc. In FIG. 4, a photodiode 6 included in one optical sensor 2 is positioned near the pixel electrode 46 above which the blue color filter $43_b$ is provided. The glass substrates 41a and 41b have orientation films 48 provided on their opposing surfaces and polarization plates 49 on the other surfaces. The liquid crystal panel 11 has two surfaces, one being a top surface on the glass substrate 41a side and the other being a bottom surface on the glass substrate 41b side.

Figure 5A:
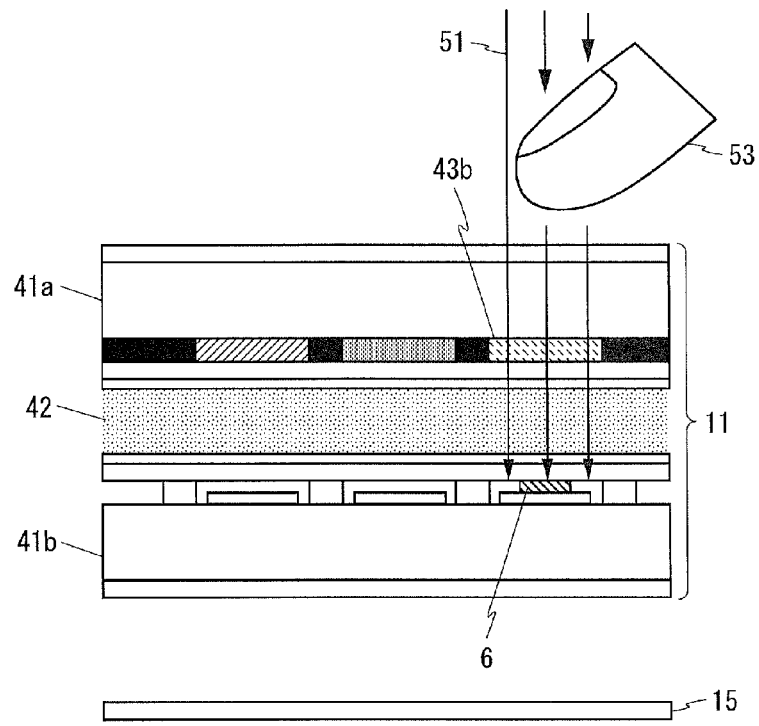
FIG. 5A is a diagram illustrating the principle of a method in which a projected image is sensed in the liquid crystal display device in the embodiment.
Figure 5B:
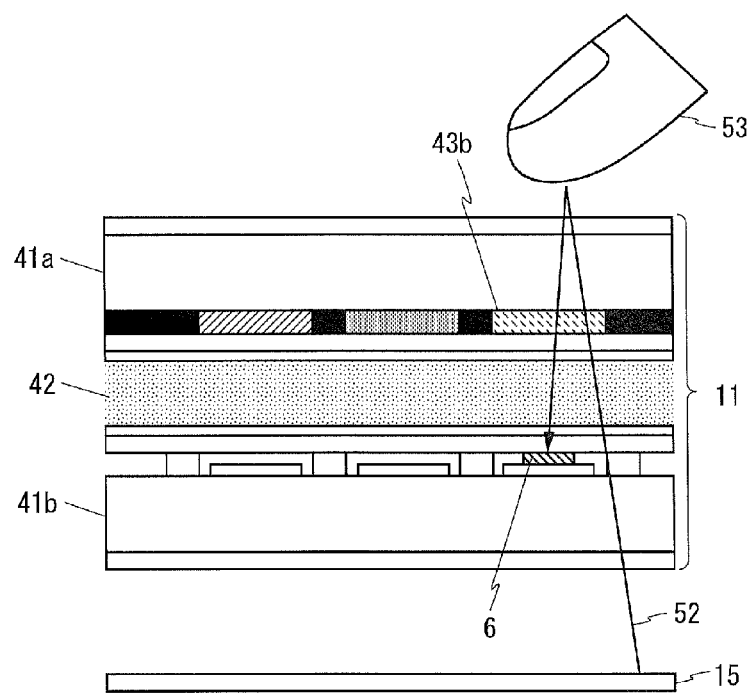
FIG. 5B is a diagram illustrating the principle of a method in which a reflected image is sensed in the liquid crystal display device in the embodiment.

When sensing a touch position on the display screen, the liquid crystal display device 10 uses either a method in which a projected image is sensed or a method in which a reflected image is sensed (or both a projected image and a reflected image are sensed). FIG. 5A is a diagram illustrating the principle of the method in which a projected image is sensed, and FIG. 5B is a diagram illustrating the principle of the method in which a reflected image is sensed. In the method in which a projected image is sensed (FIG. 5A), the optical sensor 2 including the photodiode 6 senses outside light 51 transmitted through the glass substrate 41a, the liquid crystal layer 42, etc. At this time, if a target 53 such as a finger is present near the top surface of the liquid crystal panel 11, the outside light 51 that should be incident on the optical sensor 2 is blocked by the target 53. Thus, a project image of the target 53 formed by the outside light 51 can be sensed using the optical sensor 2.

In the method in which a reflected image is sensed (FIG. 5B), the optical sensor 2 including the photodiode 6 senses reflection of light 52 from the backlight. More specifically, the light 52 emitted by the backlight 15 is transmitted through the liquid crystal panel 11 to the outside from the top surface of the liquid crystal panel 11. At this time, if the target 53 is present near the top surface of the liquid crystal panel 11, the light 52 is reflected by the target 53. For example, a human finger pad reflects light well. The reflection of the light 52 is transmitted through the glass substrate 41a, the liquid crystal layer 42, etc., and enters the optical sensor 2. Thus, a reflected image of the target 53 formed by the light 52 can be sensed using the optical sensor 2.

Furthermore, by using the two methods in combination, both the projected image and the reflected image can be sensed. That is, the optical sensor 2 can be used to simultaneously sense the projected image of the target 53 formed by the outside light 51 and the reflected image of the target 53 formed by the light 52.

Figure 6A:
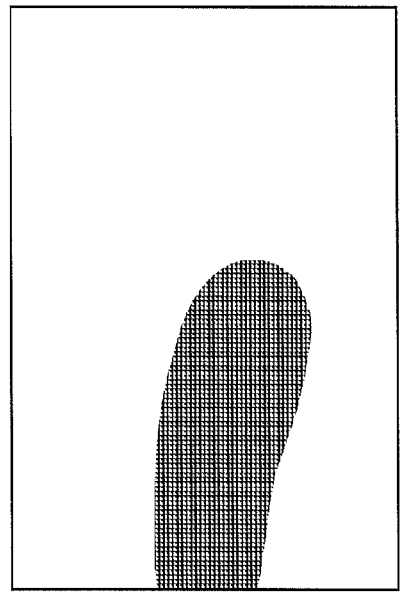
FIG. 6A is a diagram illustrating an exemplary scan picture in the embodiment, including a projected image of a finger.
Figure 6B:
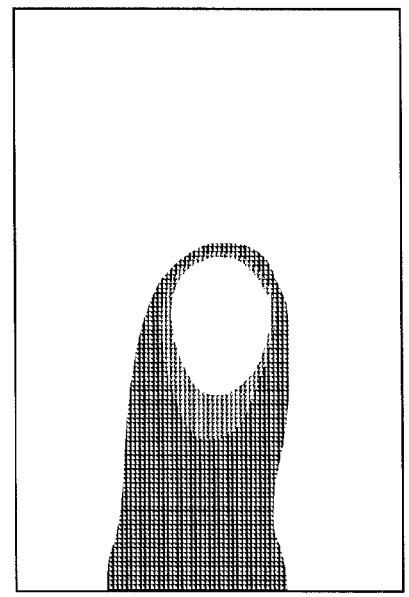
FIG. 6B is a diagram illustrating an exemplary scan picture in the embodiment, including a projected image of a finger and a reflected image of a finger pad.

FIGS. 6A and 6B are diagrams illustrating exemplary scan pictures each including a finger image. The scan picture shown in FIG. 6A includes a projected image of a finger, and the scan picture shown in FIG. 6B includes a projected image of a finger and a reflected image of a finger pad. The sensor data processing circuit 14 performs image recognition processing on such a scan picture, and outputs coordinate data Co indicating a touch position.

Hereinafter, the liquid crystal display device 10 will be described with respect to operation mode switching. The liquid crystal display device 10 has a normal mode and a standby mode to reduce power consumption, and in the standby mode, circuit operation is stopped or slowed. Concretely, in the normal mode, the panel driver circuit 16 reads signals from all of the optical sensors 2, the A/D converter 13 converts all sensor output signals into digital values, the recognition processing portion 22 performs recognition processing, and the infrared backlight 19 is lit up. On the other hand, in the standby mode, the panel driver circuit 16 reads signals from some of the optical sensors 2, the A/D converter 13 converts the output signals of these sensors into digital values, the recognition processing portion 22 stops operating, and the infrared backlight 19 is turned off (to be in non-luminous state) or dimmed (to decrease in emission luminance) depending on the case. The operation of the infrared backlight 19 will be described later.

To perform mode control as mentioned above, the sensor data processing circuit 14 includes the mode control portion 24, the decimated image memory 25, and the control register 26. The mode control portion 24 performs a mode determination process for determining whether the mode is normal or standby, a normal mode control process for controlling circuit operation in the normal mode, and a standby mode control process for controlling circuit operation in the standby mode. In transition from the normal mode to the standby mode, the decimated image memory 25 functions as an image storage portion for storing a comparison image based on signals being read from the optical sensors 2.

The control register 26 has stored therein various parameters required for the operation of the mode control portion 24. Concretely, the control register 26 has stored therein, for example, a first threshold $TH_1$, a second threshold $TH_2$, a first timer value $TM_1$, a second timer value $TM_2$, and an extraction range ER. The two thresholds $TH_1$ and $TH_2$ and the two timer values $TM_1$ and $TM_2$ are used in the mode determination process, and the extraction range ER is used in the standby mode control process. The parameters stored in the control register 26, excluding the first and second thresholds $TH_1$ and $TH_2$, are set by a host via the host I/F portion 23. Note that the first and second thresholds $TH_1$ and $TH_2$ are calculated by the mode control portion 24. Details will be described later.

Figure 7:
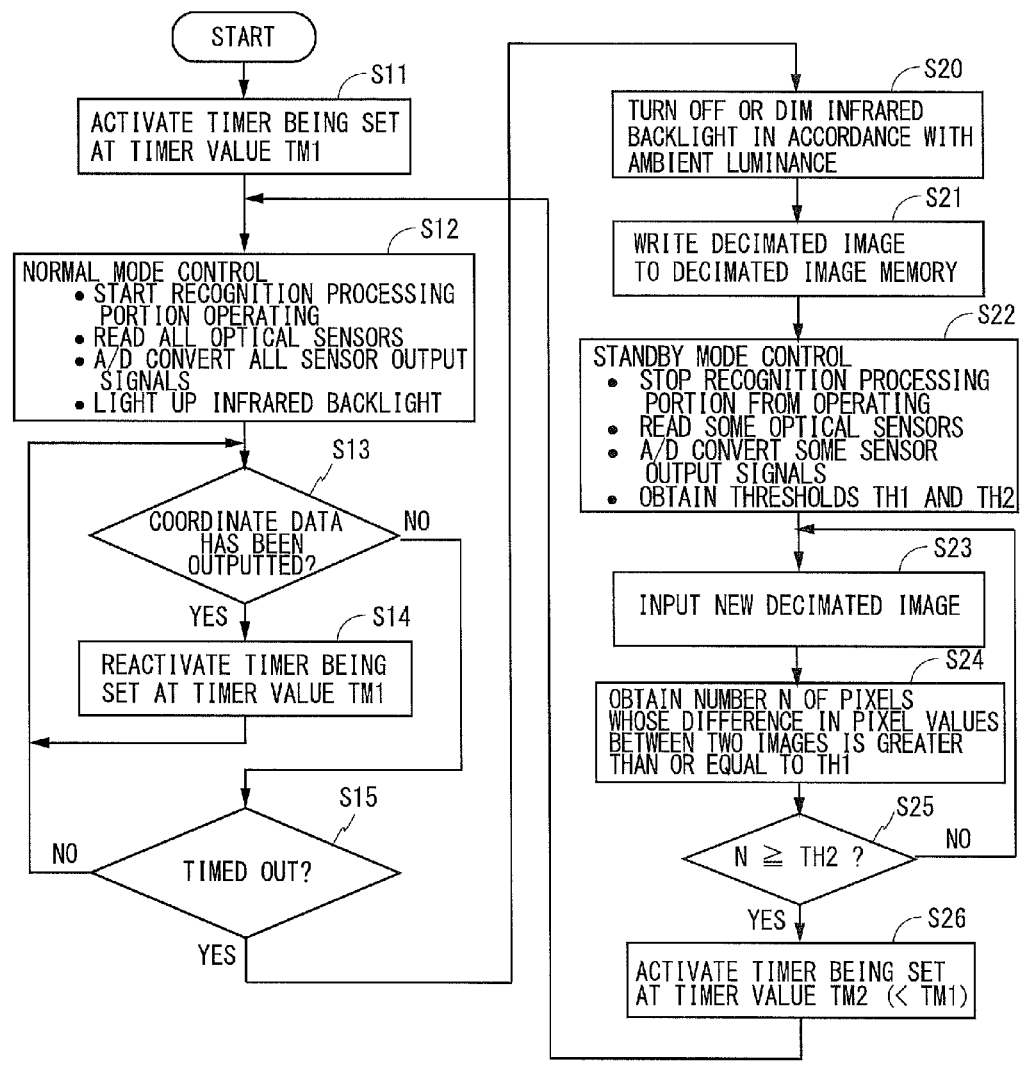
FIG. 7 is a flowchart illustrating the operation of a mode control portion of the liquid crystal display device in the embodiment.

FIG. 7 is a flowchart illustrating the operation of the mode control portion 24. The mode control portion 24 initially activates a timer being set at the first timer value $TM_1$ stored in the control register 26 (step S11). Next, the mode control portion 24 performs the normal mode control process (step S12). In step S12, in response to control signals outputted by the mode control portion 24 (the signals being indicated by broken lines in FIG. 1), the recognition processing portion 22 starts operating, the panel driver circuit 16 reads signals from all of the optical sensors 2, the A/D converter 13 converts all sensor output signals into digital values, and the infrared backlight 19 is lit up.

Next, the mode control portion 24 checks whether or not the recognition processing portion 22 has outputted coordinate data Co (step S13). The mode control portion 24 proceeds to step S14 when the coordinate data Co has already been outputted or step S15 when the coordinate data Co has not yet been outputted. In the former case, the mode control portion 24 reactivates the timer being set at the first timer value $TM_1$ stored in the control register 26 (step S14), and then proceeds to step S13. In the latter case, the mode control portion 24 checks whether or not the timer has timed out (step S15). When the timer has not yet timed out, the mode control portion 24 proceeds to step S13. When the timer has already timed out, the mode control portion 24 proceeds to step S20 to cause transition from the normal mode to the standby mode.

In transition from the normal mode to the standby mode, the mode control portion 24 turns off or dims the infrared backlight 19 in accordance with an ambient luminance L (step S20). Concretely, in transition from the normal mode to the standby mode, the mode control portion 24 receives a signal indicating the ambient luminance L from the luminance sensor 20, and sets current $I_{br}$ that should flow through the infrared backlight 19 in accordance with the ambient luminance L.

Figure 8:
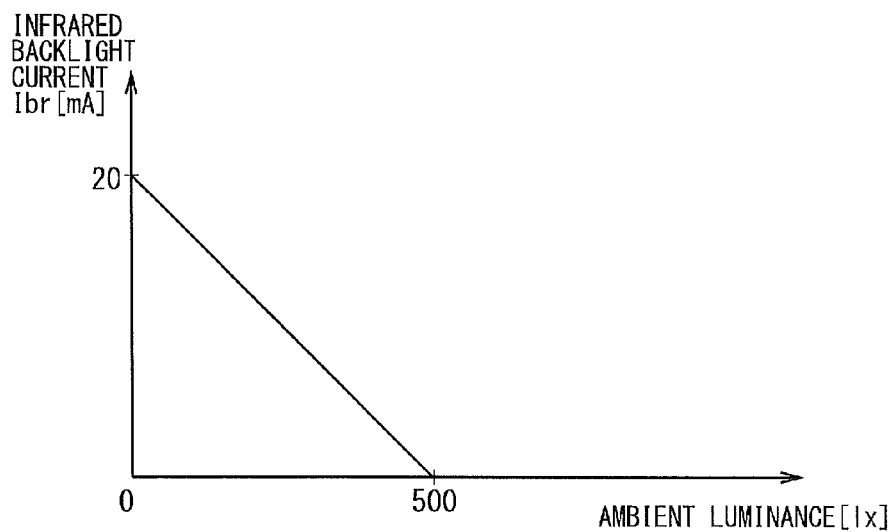
FIG. 8 is a graph illustrating the relationship between current flowing through an infrared backlight of the liquid crystal display device in the embodiment and ambient luminance.

FIG. 8 is a graph illustrating the relationship between current flowing through the infrared backlight and ambient luminance. When the ambient luminance L is 0, the optical sensors 2 cannot perform detection based on outside light, and therefore, the current Ibr flowing through the infrared backlight 19 is set at 20 mA, which corresponds to the maximum luminance, as shown in FIG. 8. It can be also appreciated that the current Ibr flowing through the infrared backlight 19 decreases as the ambient luminance L increases from 0, and when the ambient luminance L is 500 lux or more, the current Ibr flowing through the infrared backlight 19 is reduced to zero, so that the light is turned off.

In this manner, when the ambient luminance L is lower than an appropriately set threshold (here, 500 lux), the infrared backlight 19 is lit up with its amount of light being set to increase as the ambient luminance L detected by the luminance sensor 20 decreases. The reason for this is as follows. When the ambient luminance L is less than the threshold, a scan picture formed only by a shadow (of a finger or suchlike cast by outside light) detected by the optical sensor 2 tends to be unclear or difficult to distinguish from noise. Accordingly, by adding light from the infrared backlight 19, the scan picture is made to include an image based on reflected light. As a result, the scan picture can be clear or can be readily distinguished from noise. Note that in the normal mode, the infrared backlight 19 is always kept on, but the infrared backlight 19 may be controlled to be turned off or dimmed (with a lesser amount of light) in accordance with the ambient luminance L in the aforementioned manner.

In this manner, when the ambient luminance L is less than the threshold, the infrared backlight 19 is turned off, and when the ambient luminance L is greater than 0, the infrared backlight 19 is dimmed (from the maximum amount of light), thereby reducing a relatively large amount of power consumed by the infrared backlight 19.

Here, to turn off or dim the infrared backlight 19, the current Ibr that should flow through the infrared backlight 19 is appropriately set, but another well-known configuration allowing the infrared backlight 19 to be turned off or dimmed may be employed. For example, in a configuration where an inverter employing a well-known PWM (pulse-width modulation) method is used to control the luminance of the infrared backlight 19, the relationship between a PWM duty ratio and the ambient luminance may be set such that when the ambient luminance L is 0, the PWM duty ratio is set at 100%, which corresponds to the maximum luminance, the PWM duty ratio decreases as the ambient luminance L increases, and when the ambient luminance L is 500 lux or more, the PWM duty ratio is set at 0%, so that the light is turned off.

After the luminance of the infrared backlight 19 is appropriately set in accordance with the ambient luminance L, as mentioned above, the mode control portion 24 generates an image by decimating the pixels from the scan picture (hereinafter, referred to as a decimated image), and writes the decimated image to the decimated image memory 25 (step S21).

Next, the mode control portion 24 performs a standby mode control process (step S22). In step S22, in accordance with control signals outputted by the mode control portion 24, the recognition processing portion 22 stops operating, the panel driver circuit 16 reads signals from some of the optical sensors 2, and the A/D converter 13 converts the output signals of these sensors into digital values.

More specifically, the control signals outputted by the mode control portion 24 include a mode control signal indicating whether the mode is normal or standby. The mode control signal MC supplied to the liquid crystal panel 11 is inputted to the sensor row driver circuit 33 and the output control circuit 35, as shown in FIG. 2. In the sensing period for the standby mode, the sensor row driver circuit 33 sequentially selects only some of the sensor readout lines $RW_1$ to $RW_m$ and the sensor reset lines $RS_1$ to $RS_m$ pair by pair. At this time, the output control circuit 35 controls the sensor output amplifiers 34 such that only some of them output sensor output signals $SS_1$ to $SS_p$. In addition, the A/D converter 13 converts signals being read from some of the optical sensors 2 into digital signals.

In step S22, the mode control portion 24 may output a control signal indicating the range to be processed, on the basis of the extraction range ER stored in the control register 26. For example, when the extraction range ER stored in the control register 26 indicates the lower half of the display screen, the mode control portion 24 outputs a control signal to the panel driver circuit 16 and the A/D converter 13, indicating that the lower half of the display screen should be processed. The panel driver circuit 16 reads signals from the optical sensors 2 arranged in the lower half of the pixel array 17, on the basis of the control signal. At this time, the A/D converter 13 converts signals being read from the optical sensors 2 into digital signals.

In this manner, the panel driver circuit 16 reads a lesser quantity of signals from the optical sensors 2 in the standby mode than in the normal mode, in accordance with the result of determination by the mode control portion 24. Moreover, the A/D converter 13 performs conversion into digital values less frequently in the standby mode than in the normal mode, in accordance with the result of determination by the mode control portion 24. Consequently, in the standby mode, the scan picture generation portion 21 repeats outputting a decimated image obtained by decimating the pixels from a scan picture outputted in the normal mode. Note that the decimated image outputted in the standby mode is based on signals being read from the same optical sensors 2 from which the signals for generating the decimated image in step S21 are read.

Furthermore, in step S22, in transition from the normal mode to the standby mode, the mode control portion 24 calculates first and second thresholds $TH_1$ and $TH_2$, as will be described in detail later, on the basis of the ambient luminance L detected by the luminance sensor 20, to accord with the ambient luminance L, and stores these values to the control register 26.

Next, the mode control portion 24 receives a new decimated image outputted by the scan picture generation portion 21 (step S23). Then, the mode control portion 24 performs pixel-by-pixel comparison between the decimated image stored in the decimated image memory 25 and the new decimated image received in step S23, thereby obtaining the number N of pixels whose difference in pixel values is greater than or equal to the first threshold $TH_1$ stored in the control register 26 (step S24). Subsequently, the mode control portion 24 compares the number N obtained in step S24 with the second threshold $TH_2$ stored in the control register 26 (step S25). The mode control portion 24 proceeds to step S26 where $N \geq TH_2$ or step S23 where $N < TH_2$. In the former case, the mode control portion 24 activates the timer being set at the second timer value $TM_2$ stored in the control register 26 (step S26), and proceeds to step S12 to cause transition from the standby mode to the normal mode. Note that the second timer value $TM_2$ is assumed to be less than the first timer value $TM_1$.

In this manner, the mode control portion 24 causes transition from the normal mode to the standby mode when a state where no coordinate data Co is outputted lasts for a predetermined period of time (with a lapse of time corresponding to the first timer value $TM_1$), but at the time immediately after transition from the standby mode to the normal mode, the mode control portion 24 causes transition from the normal mode to the standby mode when the state where no coordinate data Co is outputted lasts for a shorter period of time (with a lapse of time corresponding to the second timer value $TM_2$) compared to the case where the normal mode has been maintained for some time.

Thereafter, the mode control portion 24 causes transition from the standby mode to the normal mode when the decimated image supplied anew changes to a predetermined degree or more from the decimated image stored in the decimated image memory 25 (the decimated image stored at the time of transition from the normal mode to the standby mode), concretely, when the number N of pixels that are included in these images and whose difference in pixel values is greater than or equal to the first threshold $TH_1$ is greater than or equal to the second threshold $TH_2$, as mentioned above.

Figure 9:
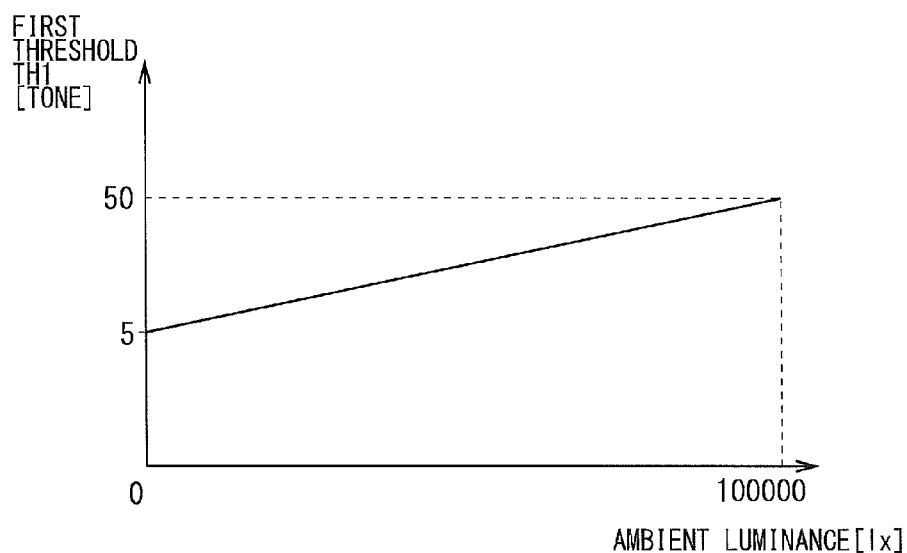
FIG. 9 is a graph illustrating the relationship between a first threshold $TH_1$ and ambient luminance for the liquid crystal display device in the embodiment.
Figure 10:
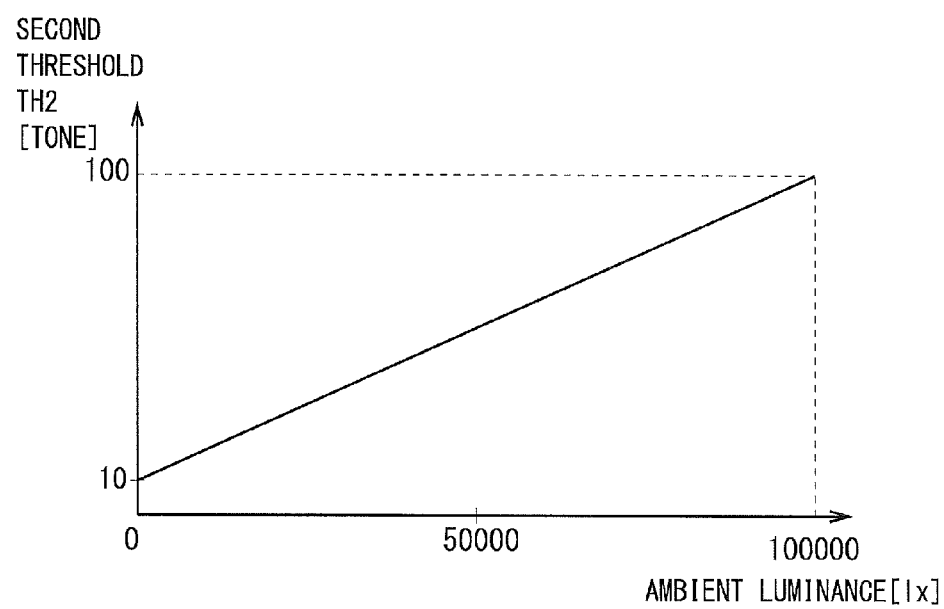
FIG. 10 is a graph illustrating the relationship between a second threshold $TH_2$ and ambient luminance for the liquid crystal display device in the embodiment.

Here, the first and second thresholds $TH_1$ and $TH_2$ are calculated in step S22 by the mode control portion 24 in accordance with the ambient luminance L, as described earlier. FIG. 9 is a graph illustrating the relationship between the first threshold $TH_1$ and the ambient luminance, and FIG. 10 is a graph illustrating the relationship between the second threshold $TH_2$ and the ambient luminance. Note that FIG. 9 is a log-log graph.

As shown in FIG. 9, when the ambient luminance L is 0, the infrared backlight 19 is lit up, as described above, but its reflected light is faint, and therefore, a new decimated image has small pixel values. Accordingly, the difference in pixel values (the difference in tones) is small between the decimated image stored in the decimated image memory 25 and the new decimated image, and therefore, the first threshold $TH_1$ is set to a relatively low value (here, five tones). As a result, it is possible to accurately detect any slight change in the pixel values. In this manner, when the ambient luminance L is low, both the decimated image stored in the decimated image memory 25 and a new decimated image have low pixel values, and therefore, by setting the first threshold $TH_1$ to a relatively low value, it is rendered possible to accurately detect any slight change in pixel values due to a change in a reflected image (or a projected image) of a target.

Furthermore, the first threshold $TH_1$ is set to a higher value (i.e., it is set so as to monotonically increase) as the ambient luminance L increases, and when the ambient luminance L is maximized (here, 100,000 lux), for example, in direct sunlight from a clear sky, the first threshold $TH_1$ is also maximized to a predetermined value (here, 50 tones). In this manner, when the ambient luminance L is high, both the decimated image stored in the decimated image memory 25 and a new decimated image have high pixel values, and therefore, by setting the first threshold $TH_1$ to a relatively high value, it is rendered possible to avoid erroneous determination due to a slight change in pixel values caused by noise or suchlike. Thus, any change in pixel values due to a change in a projected image of a target can be accurately detected. Note that the relationship shown in FIG. 9 is illustrative, and, for example, when the ambient luminance L is high, the first threshold $TH_2$ may be set to any value so long as it is high.

Next, the second threshold $TH_2$ is minimized (here, 10 units) when the ambient luminance L is 0, as shown in FIG. 10. In this manner, when the ambient luminance L is low, both the decimated image and noise have low pixel values, and therefore, by setting the second threshold $TH_2$ to a relatively low value, any change in a reflected image (or a projected image) of a target can be accurately detected on the basis of a small number of pixels whose pixel values have changed.

Furthermore, the second threshold $TH_2$ increases (i.e., it is set so as to monotonically increase) as the ambient luminance L increases, and when the ambient luminance L is maximized (here, 100,000 lux), for example, in direct sunlight from a clear sky, the second threshold $TH_2$ is set to a predetermined maximum value (here, 100 units). Note that here, the total number of optical sensors 2 equivalent to the total number of pixels is 480,000. In this manner, when the ambient luminance L is high, the second threshold $TH_2$ is set high, and therefore, it is possible to avoid erroneous determination even when the number of pixels whose pixel values exceed the first threshold $TH_1$ increases due to increased pixel values of noise. Thus, a change in a projected image can be accurately detected. Note that the relationship shown in FIG. 10 is illustrative, and, for example, when the ambient luminance L is high, the second threshold $TH_2$ may be set to any value so long as it is high.

In this manner, when the ambient luminance L is low in step S20, the decimated image that is generated and stored to the decimated image memory 25 in step S21 by the mode control portion 24 and the new decimated image that is outputted in step S23 by the scan picture generation portion 21 are acquired with the infrared backlight 19 being appropriately lit up (or dimmed), and therefore, these images include a reflected image obtained on the basis of light from the backlight. Thus, the scan picture can be clear and can be readily distinguished from noise. However, the pixel values of the reflected image are not considerably higher than those of noise, and therefore, by setting the first threshold $TH_1$ low, it is rendered possible to distinguish noise from any change in pixel values due to a change in the reflected image, thereby accurately detecting a slight change in the reflected image. Thus, it is possible to prevent the standby mode from not being cancelled by the erroneous determination that the reflected image has not changed because the scan picture has little change.

Furthermore, when the ambient luminance L is high, the decimated images are acquired with the infrared backlight 19 off, and therefore, they include projected images formed by outside light with high luminance. As a result, the scan picture is clear but includes noise with high pixel values, and therefore, the second threshold $TH_2$ is set high, thereby preventing the standby mode from being erroneously cancelled by mistaking a change in the scan picture due to increased noise for a change in the projected image.

Hereinafter, the effect of the liquid crystal display device 10 according to the present embodiment will be described. The liquid crystal display device 10 according to the present embodiment includes the sensor-embedded liquid crystal panel 11, the panel driver circuit 16, the recognition processing portion 22, the mode control portion 24, and the decimated image memory 25. The mode control portion 24 determines whether the mode is normal or standby, and causes the recognition processing portion 22 to operate in the normal mode and stop operating in the standby mode. In transition from the normal mode to the standby mode, the decimated image memory 25 stores a decimated image, and when a decimated image supplied anew changes to a predetermined degree or more from the decimated image stored in the decimated image memory 25, the mode control portion 24 causes transition from the standby mode to the normal mode. In particular, the mode control portion 24 performs pixel-by-pixel comparison between the decimated image stored in the decimated image memory 25 and the decimated image supplied anew, and causes transition from the standby mode to the normal mode when the number of pixels whose difference in pixel values is greater than or equal to the first threshold $TH_1$ is greater than or equal to the second threshold $TH_2$.

In this manner, it is determined whether the mode is normal or standby, and the recognition processing portion 22 is stopped from operating in the standby mode, thereby reducing power consumption of the liquid crystal display device 10. Moreover, when the decimated image changes to a predetermined degree or more after transition to the standby mode, the mode transitions to normal, so that the transition to the normal mode can take place before a target touches the screen. Thus, a touch position can be promptly detected after a quick exit from the standby mode.

Furthermore, the two thresholds $TH_1$ and $TH_2$ are calculated in accordance with the ambient luminance L, and stored to the control register 26. As a result, a reflected image or video included in the scan picture can be accurately distinguished from noise, or the standby mode can be prevented from being erroneously cancelled. Moreover, the conditions of the mode determination process can be adjusted in accordance with the type of use, so that the mode determination process can be performed in a preferred manner.

Furthermore, in accordance with the result of detection by the mode control portion 24, the panel driver circuit 16 reads a lesser quantity of signals from the optical sensors 2 in the standby mode than in the normal mode, and the A/D converter 13 performs conversion to digital values less frequently in the standby mode than in the normal mode. In this manner, in the standby mode, the panel driver circuit 16 and the A/D converter 13 are slowed in operation, making it possible to reduce power consumption of the liquid crystal display device 10 while generating a decimated image required for the mode determination process. Moreover, in the standby mode, the mode control portion 24 dims or turns off the infrared backlight 19 in accordance with the ambient luminance L. As a result, power consumption of the liquid crystal display device 10 can be reduced.

Note that for the liquid crystal display device according to the present embodiment, numerous types of variants can be made. For example, in the liquid crystal display device of the present invention, the decimated image stored in the decimated image memory 25 may be an image generated at the end of the normal mode or at the beginning of the standby mode, so long as it is stored at the time of transition from the normal mode to the standby mode. However, at the time of image generation, the infrared backlight 19 needs to be dimmed or turned off in accordance with the ambient luminance L, such that the same illumination as in the standby mode can be achieved. The reason is that a comparison is made with a decimated image for the standby mode.

Here, in the case where the ambient luminance varies between the time of image generation and the time of the standby mode, the decimated image written to the decimated image memory 25 differs from a new decimated image to be outputted by the scan picture generation portion 21, so that the standby mode is cancelled.

Furthermore, the control register 26 does not have to store all of the parameters mentioned above, and part or all of the parameters may be fixed values. For example, the control register 26 may have only one of the first and second thresholds $TH_1$ and $TH_2$ stored therein, one of them may be an appropriate value calculated in accordance with the ambient luminance L, and the other may be a fixed value. Moreover, the extraction range ER may be always set as the entire display screen.

Furthermore, a predetermined threshold may be calculated, in place of the first and second thresholds $TH_1$ and $TH_2$, in accordance with the ambient luminance L, and the standby mode may be cancelled only when a new decimated image (inputted in step S23) is determined to have changed to a predetermined degree or more, i.e., the threshold or more, from the decimated image stored in the decimated image memory 25 with reference to a parameter indicating the degree of change in the new decimated image from the decimated image stored in the decimated image memory 25 (e.g., a value or suchlike which indicates the correspondence between the images).

As described above, in the display device of the present invention, power consumption is reduced by stopping or delaying circuit operation in the standby mode, and the first and second thresholds $TH_1$ and $TH_2$ are set to appropriate values in accordance with the ambient luminance L, so that the influence of a change in the ambient luminance L can be avoided or reduced, making it possible to accurately determine whether or not to cancel the standby mode.

Specifically, when the ambient luminance L is low, the first threshold $TH_1$ is set low, as described earlier, so that a change in pixel values can be distinguished from noise and even a slight change can be accurately detected, thereby preventing the standby mode from not being cancelled by the erroneous determination that the reflected or projected image has not changed because the scan picture has little change. Moreover, when the ambient luminance L is high, the second threshold $TH_2$ is set high, thereby preventing the standby mode from being erroneously cancelled by mistaking a change in the scan picture due to increased noise for a change in the projected image. Thus, in the present display device, a touch position can be promptly detected by correctly exiting the standby mode.

INDUSTRIAL APPLICABILITY

The present invention is applied to image display devices having a plurality of optical sensors provided on their display panels, and is suitable for image display devices, such as liquid crystal display devices, in which a normal mode and a standby mode for reducing power consumption are appropriately switchable there between.

DESCRIPTION OF THE REFERENCE CHARACTERS 1 pixel circuit
2 optical sensor
10 liquid crystal display device
11 sensor-embedded liquid crystal panel
12 display data processing circuit
13 A/D converter
14 sensor data processing circuit
15 backlight
16 panel driver circuit 17 pixel array
18 white backlight
19 infrared backlight
20 luminance sensor
21 scan picture generation portion
22 recognition processing portion
23 host I/F portion
24 mode control portion
25 decimated image memory
26 control register

The invention claimed is:

1. A display device provided with a plurality of optical sensors, comprising:
a display panel including two-dimensionally arranged pixel circuits and optical sensors;
a driver circuit for performing operations of writing signals to the pixel circuits in accordance with display data and reading signals from the optical sensors in accordance with amounts of received light;
a recognition processing portion for performing recognition processing on a recognition target image based on signals being read from the optical sensors in a normal mode, and outputting coordinate data indicating a position of a sensing target;
a mode control portion for determining whether a mode is normal or standby and causing the recognition processing portion to operate in the normal mode or stop operating in the standby mode;
an image storage portion for storing a comparison image based on signals being read from the optical sensors in transition from the normal mode to the standby mode; and
a luminance detection portion for detecting an ambient luminance, wherein,
the mode control portion causes transition from the standby mode to the normal mode when a new comparison image based on signals being read from the optical sensors is determined to have changed to a predetermined degree or more from the comparison image stored in the image storage portion, the predetermined degree corresponding to the ambient luminance detected by the luminance detection portion.

2. The display device according to claim 1, wherein the mode control portion performs pixel-by-pixel comparison between the comparison image stored in the image storage portion and the new comparison image, and causes transition from the standby mode to the normal mode when the number of pixels whose difference in pixel values is greater than or equal to a first threshold is greater than or equal to a second threshold.

3. The display device according to claim 2, wherein at least one of the first and second thresholds is determined in accordance with the ambient luminance detected by the luminance detection portion.

4. The display device according to claim 3, wherein the at least one of the first and second thresholds is determined so as to monotonically increase relative to the ambient luminance detected by the luminance detection portion.

5. The display device according to claim 1, further comprising an infrared backlight for emitting infrared light, wherein,
the mode control portion turns off or dims the infrared backlight in the standby mode in accordance with the ambient luminance detected by the luminance detection portion.

6. The display device according to claim 1, wherein the comparison image has a smaller number of pixels than the recognition target image.

7. The display device according to claim 6, wherein the comparison image is an image obtained by decimating the pixels from the recognition target image.

8. The display device according to claim 7, wherein the driver circuit reads a lesser quantity of signals from the optical sensors in the standby mode than in the normal mode in accordance with a result of determination by the mode control portion.

9. A method for controlling a display device provided with a display panel including two-dimensionally arranged pixel circuits and optical sensors, and a recognition processing portion for performing recognition processing on a recognition target image based on signals being read from the optical sensors and outputting coordinate data indicating a position of a sensing target, the method comprising:
a step of writing signals to the pixel circuits in accordance with display data;
a step of reading signals from the optical sensors in accordance with amounts of received light;
a step of determining whether a mode is normal or standby;
a step of activating the recognition processing portion in the normal mode;
a step of stopping the recognition processing portion from operating in the standby mode;
a step of storing a comparison image based on signals being read from the optical sensors in transition from the normal mode to the standby mode; and
a luminance detection step of detecting an ambient luminance, wherein,
in the step of determining the mode, transition from the standby mode to the normal mode takes place when a new comparison image based on signals being read from the optical sensors is determined to have changed to a predetermined degree or more from the comparison image stored in the image storage step, the predetermined degree corresponding to the ambient luminance detected in the luminance detection step.

* * * * *